United States Patent [19]
Cohn et al.

[11] Patent Number: 5,734,861
[45] Date of Patent: Mar. 31, 1998

[54] LOG-STRUCTURED DISK ARRAY WITH GARBAGE COLLECTION REGROUPING OF TRACKS TO PRESERVE SEEK AFFINITY

[75] Inventors: Oded Cohn, Haifa, Israel; Richard Lewis Mattson, Pacific Grove; Jaishankar Moothedath Menon, San Jose, both of Calif.

[73] Assignee: International Business Machines Corporation, Armonk, N.Y.

[21] Appl. No.: 571,010

[22] Filed: Dec. 12, 1995

[51] Int. Cl.⁶ .................................................. G06F 12/12
[52] U.S. Cl. ......................... 395/461; 395/404; 395/440; 395/463; 395/487; 395/492; 395/497.01; 395/622; 395/876
[58] Field of Search ................................. 395/463, 439, 395/440, 622, 404, 461, 487, 876, 497.01, 492

[56] References Cited

U.S. PATENT DOCUMENTS

| | | | |
|---|---|---|---|
| 4,914,656 | 4/1990 | Dunphy, Jr. et al. | 371/10.2 |
| 4,916,605 | 4/1990 | Beardsley et al. | 395/489 |
| 5,083,229 | 1/1992 | Frey, Jr. | 360/78.04 |
| 5,124,987 | 6/1992 | Milligan et al. | 395/182.05 |
| 5,416,915 | 5/1995 | Mattson et al. | 395/441 |
| 5,418,921 | 5/1995 | Cortney et al. | 395/441 |
| 5,422,762 | 6/1995 | Jerbic | 360/48 |
| 5,442,752 | 8/1995 | Styczinski | 395/404 |
| 5,542,066 | 7/1996 | Mattson et al. | 395/463 |
| 5,551,002 | 8/1996 | Rosich et al. | 395/461 |
| 5,551,003 | 8/1996 | Mattson et al. | 395/463 |

FOREIGN PATENT DOCUMENTS

| | | |
|---|---|---|
| 6-175787 | 6/1994 | Japan . |
| 6-214722 | 8/1994 | Japan . |
| 7-36634 | 2/1995 | Japan . |
| 7-44326 | 2/1995 | Japan . |
| 7-44331 | 2/1995 | Japan . |

OTHER PUBLICATIONS

"Strage (sic) System", JAPIO, abstract of Patent No. JP 07-44326.

"Disk Array Device", JAPIO, abstract of Patent No. JP 07-36634.

"A Case for Redundant Arrays of Inexpensive Disks (RAID)", by David A. Patterson, Garth Gibson, and Randy H. Katz, Report No. UCB/CSD 87/391, University of California (Berkeley), Dec. 1987, pp. 1-22.

"The Design and Implementation of a Log-Structured File System", by Mendel Rosenblum and John K. Ousterhout, ACM Transactions on Computer Systems, vol. 10, No. 1, Feb. 1992, pp. 26-51.

(List continued on next page.)

*Primary Examiner*—Tod R. Swann
*Assistant Examiner*—Hong C. Kim
*Attorney, Agent, or Firm*—Baker, Maxham, Jester & Meador

[57] ABSTRACT

A log-structured array (LSA) includes a relatively large, non-volatile cache memory as well as a memory segment write buffer. The LSA cache memory contains both updated logical tracks received from the host system and also clean logical tracks read from direct access storage devices of the array. When the fraction of updated tracks in the cache memory exceeds a threshold value, updated tracks are moved from the LSA cache memory to the memory segment. With each modified track to be moved, adjacent modified tracks also are moved. The updated tracks are moved regardless of their location in the updated LRU list. Clean tracks in the LSA cache memory are moved into the memory segment as well, when additional clean tracks are needed in the cache memory. The clean tracks are selected from the bottom of the LSA cache clean track LRU list. Checking for adjacency also can occur at garbage collection time, performed in a background mode. The criterion for determining logical adjacency can use information from the host computer and can be changed dynamically to optimize performance.

48 Claims, 10 Drawing Sheets

OTHER PUBLICATIONS

"Automatic Tuning of Data Placement and Load Balancing in Disk Arrays", by Peter Scheuermann, Gerhard Weikum, and Peter Zabback, Apr. 1992, pp. 3–22.

"Adaptive Load Balancing in Disk Arrays", by P. Scheuermann, et al., in *Foundations of Data Organization and Algorithms*, 4th Int'l. Conference, Oct. 13–15, 1993, D. Lomet (Ed.), pp. 344–361.

"Data Set Affinity Matrix Program", R. Ascherfield, C. Raby, IBM Technical Disclosure Bulletin, Vo. 27, No. 10B, Mar. 1985, pp. 6142–6143.

"Disk Array Device", Japanese Patent Information Organization (JAPIO), abstract of Patent No. 06-175787.

"Data Storing System for Disk Array Device", JAPIO, abstract of Patent No. JP 06-214722.

"Disk Array Device and Its Control Method", JAPIO, abstract of Patent No. JP 07-44331.

| LOGICAL DASD | LOGICAL TRACK | PHYSICAL LOCATION |
|---|---|---|
| LOGICAL DEVICE No. 1 | TRACK 1 | PHYSICAL DEVICE No., SEGMENT-COL., SECTOR, LENGTH |
| | TRACK 2 | |
| | ⋮ | |
| | TRACK n | |
| LOGICAL DEVICE No. 2 | TRACK 1 | |
| | ⋮ | |
| | TRACK n | |
| LOGICAL DEVICE No. 3 | TRACK 1 | |
| | ⋮ | |
| | TRACK n | |
| LOGICAL DEVICE No. 4 | TRACK 1 | |
| | ⋮ | |
| | TRACK n | |

FIG. 3

LOG-STRUCTURED DISK ARRAY WITH GARBAGE COLLECTION REGROUPING OF TRACKS TO PRESERVE SEEK AFFINITY

BACKGROUND OF THE INVENTION

1. Field of the Invention

This invention relates generally to data storage systems and, more particularly, to data storage systems organized as log-structured arrays of disk drive units.

2. Description of the Related Art

A data storage system having multiple direct access storage devices (DASDs), such as disk drive units, typically stores data and other information in an arrangement called a log structured file, which provides what is known as a log-structured array (LSA). In an LSA, data files are stored among multiple DASDs and data file changes are temporarily stored, or buffered, in an input write buffer. The input write buffer is also called a memory segment. When the input write buffer is filled, the data file changes that were stored in the buffer are recorded sequentially back into the DASDs. Thus, the data files are stored in a sequential structure that can be characterized as an infinite tape or log. Such a structure eliminates most disk seek operations during data recording and retrieval. The information recorded back into the DASDs from the LSA includes data blocks, attributes, index blocks, directories, and other information used by the data storage system to manage the data operations.

Each disk drive unit of an LSA includes one or more platters coated with magnetic material and rotating at high speed on a common spindle. Data can be stored and read from the magnetic material using a transducer such as a magnetic read/write head mounted on a disk arm that moves radially across a platter. One head and arm combination is provided for each platter and all head/arm combinations for a particular disk drive unit move across all the platters in unison. Data is recorded in concentric tracks (or alternatively in spiral tracks) on each surface of a platter having a read/write head. Each track on a disk platter is comprised of a group of radial sectors. Each sector can contain multiple byte lengths of data, called records or blocks.

Data can be stored in a disk drive unit under a variety of formats, including either a fixed block or variable length format such as count-key-data (CKD). A fixed block format is used, for example, with the Model 0664 disk drive unit available from International Business Machines Corporation (IBM Corporation). In an LSA containing disk drive units like the Model 0664 connected to a host computer, an LSA controller typically emulates one or more logical devices such that the physical nature of the disk drive units is transparent to the host operating system and application programs using the LSA. That is, read and write commands generated by the operating system and application programs are received by the LSA controller and interpreted so that a reference to a data file at a logical device (an LSA "location") is automatically mapped onto the appropriate physical device at a disk platter and track-sector location.

In an LSA, the recording area of each disk drive unit is assigned to consecutive logical (LSA) areas called segment-columns. A logical segment-column of an LSA is typically the same size as a physical disk cylinder, which comprises all of the same-position tracks on all the platters of a disk drive unit. Thus, a disk drive unit in an LSA typically includes as many segment-columns as there are tracks on a single disk platter. For example, if an LSA includes five disk drive units each having five platters, then track one on each of the five platters of the first disk drive unit forms a segment-column of the LSA, track two on each of the five platters in the first disk drive unit forms another segment-column, track three on each of the five platters forms another segment-column, and so forth. Similarly, track one on each platter of the second disk drive unit forms another segment-column, track two of the platters in the second disk drive unit forms another segment-column, and so forth.

The collection of disk recording area comprising corresponding segment-columns from each of the disk drive units in an LSA forms what is called a logical segment. For example, an LSA might use disk drive units that have a track numbering scheme wherein the first (innermost) track on each platter in a drive unit is designated the first track, the next track on each platter is designated the second track, and so forth. If each disk drive unit has five platters, then a segment-column is formed from the collection of track x on each of the five platters in a disk drive unit and a segment is formed from the collection of segment-column y from each disk drive unit. An LSA segment therefore would comprise all of the like-numbered tracks from each of the disk drive units in the LSA. Thus, the first segment would comprise the collection of track 1 on each platter of the first drive unit, track 1 on each platter of the second disk drive unit, and so forth through the collection of track 1 of the fifth disk drive unit. In this way, it should be apparent that an LSA typically has as many segments as there are segment-columns in a single disk drive unit.

It should be noted that many conventional multiple-platter disk drive systems number tracks sequentially from platter to platter of a disk drive unit. That is, conventionally the innermost track on the first platter is track 1, the innermost track on the second platter is track 2, and so forth such that the innermost track on the last (fifth) platter is track 5. Thus, the second track on the first platter of a five-platter disk drive unit would be track 6, the second track on the second platter would be track 7, the third track on the first platter would be track 11, the third track on the second platter would be track 12, and so forth. As before, the first LSA segment would comprise the collection of the innermost track on each platter (the first segment-column) from the first disk drive unit, the first segment-column from the second drive, and so forth through the fifth drive, the second LSA segment would comprise the collection of the second segment-column (second track) from all of the disk drives, and so forth. Except for the track numbering convention, the recording area relationship between segments and segment-columns would be as described above.

One segment-column per segment in an LSA is used to store parity information that is produced from a logical exclusive-OR operation on data stored in the remaining data segment-columns of the segment. For improved performance, the segment-columns containing the parity information are not all stored on the same disk drive unit, but are rotated among the disk drive units. This ensures accurate data rebuild in the event of a disk failure.

Whether an LSA stores information according to a variable length format such as a count-key-data (CKD) architecture or according to a fixed block architecture, the LSA storage format of segment-columns is mapped onto the physical storage space in the disk drive units so that a logical track of the LSA is stored entirely within a single segment-column mapped onto a disk drive unit of the array. The size of a logical track is such that many logical tracks can be stored in the same LSA segment-column.

The input write buffer of an LSA such as described above typically has a storage capacity of approximately one logical segment, so that the data in the write buffer and the parity segment-column computed from it together comprise approximately one segment's worth of information. When the input write buffer becomes substantially full, the LSA controller computes the parity segment-column for the data in the write buffer and records the data and parity information into the next available empty segment mapped onto the array. That is, the first segment-column of the input write buffer is written into the first segment-column of the next available segment, the second segment-column of the input write buffer is written into the second segment-column of the same next segment, the third segment-column of the input write buffer is written into the third segment-column of the same next segment, and the process is repeated to the last segment-column.

Recording the input write buffer contents into corresponding segment-columns of the same next empty disk segment avoids well-known write penalties associated with disk arm movement that otherwise would be incurred if each segment in the buffer were written back to its original disk location each time a new data value must be recorded. In the configuration described above, for example, if the fourth segment were empty, then all the disk arms of all the disk drive units would be swung to the fourth track. Writing into an empty disk segment also avoids the well-known write penalties associated with read-modify-write operations for data blocks and parity blocks in RAID-type data storage systems, which characterize most log structured arrays.

The LSA controller keeps track of the next available empty segment for data recording and consults the LSA directory to determine the proper disk arm position for the empty segment. When the input write buffer is full, the one segment's worth of data and parity information will be transferred to the next free segment that is mapped onto physical locations in the disks. Therefore, when the input write buffer is to be written into the next empty disk segment, the disk arms in the disk drive units are moved to the proper positions to be at the same segment-column for recording. Recording can take place serially or in parallel so that the first segment-column from the input write buffer is recorded in the first segment-column of the next empty disk segment, the second segment-column from the input write buffer is recorded in the second segment-column of the disk segment, and so forth until all the contents of the write buffer data and the parity segment-column are recorded into the appropriate disk locations.

As the data values and parity value information (collectively referred to as data) are recorded into the disk storage locations, the new locations of the data values are maintained in the LSA directory. At each new disk location of a segment, the valid information corresponding to each new data value is stored. Thereafter, if a single data record or block of the data file must be changed, the new data is written into the input write buffer until one segment's worth of new data is accumulated in the write buffer. The new segment is then stored into the disk locations and the LSA directory is updated to indicate where the particular new data values may be found. In this way, write operations to the disk platters only need occur when an entire segment in the write buffer is to be recorded, rather than every time a new data value occurs. When a data value is to be retrieved from disk, the LSA controller consults the LSA directory to locate the data value.

Table 1 listed below shows the logical segment assignments for segment-columns of a data storage system having five disk drive units. The first disk drive unit is designated Disk 1, the second disk drive unit is designated Disk 2, and so forth. Table 1 shows that each disk drive unit has twenty-five blocks of storage space and that each segment-column is mapped onto five blocks of disk storage space.

Table 1 also shows that the logical storage locations are divided into five segments such that the first five blocks of each disk drive unit (blocks 00 to 04) are assigned to the first logical segment, the next five blocks (blocks 05 to 09) are assigned to the next segment, and so forth. Blocks assigned to the first segment are represented by a "@" entry in Table 1, blocks assigned to the second segment are represented by a "#" entry, blocks assigned to the third segment are represented by a "D" entry, blocks assigned to the fourth segment are represented by a "*" entry, and blocks assigned to the fifth segment are represented by a "d" entry.

In particular, Table 1 shows that blocks 00–04 of each of the five disk drive units are assigned to segment number zero, blocks 05–09 of each of the five disk drives are assigned to segment number one, blocks 10–14 of the five disk drives are assigned to segment number two, blocks 15–19 of the five disk drives are assigned to segment number three, and blocks 20–24 of the five disk drives are assigned to segment number four. Thus, the first five blocks on the first disk drive correspond to a segment-column, the second five blocks on the first disk drive correspond to another segment-column, and so forth.

TABLE 1

| Segments | Blocks | Disks | | | | |
|---|---|---|---|---|---|---|
| | | 1 | 2 | 3 | 4 | 5 |
| 0 | 00 | @ | @ | @ | @ | @ |
| | 01 | @ | @ | @ | @ | @ |
| | 02 | @ | @ | @ | @ | @ |
| | 03 | @ | @ | @ | @ | @ |
| | 04 | @ | @ | @ | @ | @ |
| 1 | 05 | # | # | # | # | # |
| | 06 | # | # | # | # | # |
| | 07 | # | # | # | # | # |
| | 08 | # | # | # | # | # |
| | 09 | # | # | # | # | # |
| 2 | 10 | D | D | D | D | D |
| | 11 | D | D | D | D | D |
| | 12 | D | D | D | D | D |
| | 13 | D | D | D | D | D |
| | 14 | D | D | D | D | D |
| 3 | 15 | * | * | * | * | * |
| | 16 | * | * | * | * | * |
| | 17 | * | * | * | * | * |
| | 18 | * | * | * | * | * |
| | 19 | * | * | * | * | * |
| 4 | 20 | d | d | d | d | d |
| | 21 | d | d | d | d | d |
| | 22 | d | d | d | d | d |
| | 23 | d | d | d | d | d |
| | 24 | d | d | d | d | d |

It should be understood that, in an actual data storage system, there typically will be many more disk drive units, platters, blocks, and segments than are illustrated in Table 1. The exemplary values given here are for purposes of illustration only. In Table 1, the disk blocks corresponding to the different segments are designated with different characters for purposes of illustration. Those skilled in the art will understand that an LSA directory actually will include a designation or identification of the data (or lack thereof) that is contained in each storage block, as described further below.

A block that contains data values for which there have been later write operations, meaning that the data values have been superseded, is available for recording new data. Such superseded data is referred to as garbage (or "dead")

and the corresponding disk area is referred to as a garbage block or garbage segment-column. A block containing data values that have not been superseded contains valid data and is referred to as a clean block or a live block. After a number of data modifying write operations have been carried out in disk drive units forming a log structured array, there likely will be at least one segment's worth of garbage blocks scattered throughout the array. A fully empty segment, which is available for receiving new (live) data values from the input write buffer, can be created by gathering these scattered garbage blocks together.

Creating empty segments is important because, for a controller in an LSA to continue write operations as new data values are received from the input write buffer, new empty segments in the disk drive units must be produced continually. New empty segments are typically produced by identifying clean blocks within segments containing live data and moving the live data from these segments to consolidate them in a smaller number of full segments. Such consolidation creates one or more segments that contain only garbage blocks. A segment that is entirely garbage is therefore empty and is available for recording one segment's worth of data from the write buffer, as described above. The process of consolidating non-contiguous clean blocks so as to consolidate live data and form empty segments is called garbage collection.

Garbage collection is usually done by first locating a target segment having the fewest number of live data blocks (and therefore the largest number of garbage blocks) in a disk drive unit of the log structured array. The live data values of the target segment are read into a temporary storage buffer. Another target segment is then identified and the live data from that target segment is read into the temporary storage buffer. The process of locating target segments and reading their live data blocks into the temporary storage buffer is repeated segment by segment until the buffer is full. Typically, several target segments must be processed before the buffer will be full. After the temporary storage buffer becomes full, the data from the buffer is recorded back into an empty segment in the disk storage array. As garbage collection proceeds, live data from the various target segments is read into the temporary storage buffer, the buffer fills up, and the live data is stored back into an empty segment of the array. After the live data values in the temporary storage buffer are written into the array, the segments from which the live data values were read are designated empty. In this way, live data is consolidated and new empty segments are produced. Typically, garbage collection is performed when the number of empty segments in the disk array drops below a predetermined threshold value.

A problem with LSAs such as described above is that they frequently are subject to workloads that comprise data operations in a random write, sequential read pattern. In particular, LSA logical tracks often tend to be updated randomly and read from sequentially. As new data values are written, the superseded original values essentially comprise "holes" in existing segments. In this way, blocks of data in logically adjacent tracks get written into different segments that are physically scattered amongst the disks, although they might at one time have been in contiguous physical locations. If logically sequential read operations are then requested, it might be necessary to jump around from disk location to disk location to retrieve two logically adjacent tracks of the LSA. Such a condition is sometimes referred to as increased "seek affinity", defined as the ratio of the average seek time while executing a given workload divided by the average seek time while executing a random workload. Thus, the smaller the value for seek affinity, the better the indicated performance.

Ordinarily, LSA operation is more efficient than typical conventional physical storage systems. If LSA logical tracks are updated randomly and logically adjacent tracks are written into different segments of the disk drive units, a performance problem does not usually arise as long as the workload has no sequential read content. If data operations include many sequential read operations, however, then long disk arm motions may be needed to retrieve two logically adjacent tracks in a log-structured array (LSA), whereas more conventional storage management implementations would have placed the tracks physically near each other and would not have needed the long arm motions to retrieve the data.

The long arm motion problem also occurs for data operations in which a host computer application generates sequential write operations that can be performed one logical track at a time, but that occur between long intervals of time. In such a case, write requests from different applications that are received between the sequential write operations from the first application, could cause logically adjacent tracks to be written into different segments on the disk drive units. Again, long disk arm motions might be necessary to retrieve logically adjacent tracks.

From the discussion above, it should be apparent that there is a need for a storage system implementing a log-structured disk storage array that reduces disk arm motion needed to record and retrieve data. The present invention satisfies this need.

SUMMARY OF THE INVENTION

In accordance with the invention, a log-structured array (LSA) of direct access storage devices (DASDs) includes a relatively large, non-volatile cache memory in addition to the memory segment write buffer provided with conventional LSA systems. The LSA cache memory contains both updated logical tracks received from the host system and also clean logical tracks read from disk. If a logical track is desired for a read operation, instead of consulting the LSA directory for a physical disk location and reading the track from there, the LSA controller first consults the LSA cache memory. If the logical data track is not found in the LSA cache memory, then the LSA controller finds the physical disk location from the LSA directory, reads the track, and places the data track in the LSA cache. Because the LSA cache memory is much bigger than the input write buffer, there is a greater chance that multiple tracks will not have been written back to disk before they are read, thus saving a disk arm movement to perform the retrieval. Similarly, disk arm movement in storing data tracks is reduced with the LSA cache memory of the present invention.

The LSA cache memory is organized in a least-recently-used (LRU) fashion, with the clean logical tracks organized in one LRU list and the updated (dirty) tracks organized in another LRU list. The LSA cache memory is maintained by the LSA controller so the controller knows the fraction of cache memory occupied by dirty tracks. When this fraction exceeds a predetermined dirty track threshold, a dirty track is moved from the LSA cache memory to the memory segment, where they get written to disk. This operation is referred to as destaging the LSA cache. In accordance with the invention, regrouping of tracks occurs when a dirty track is written back to the memory segment so that the dirty track is written back along with logically adjacent dirty tracks. The dirty tracks are moved regardless of where they are in the dirty track LRU list.

Thus, in a first aspect of the invention, all dirty blocks that are logically adjacent (within an adjacency definition) to a dirty block being written back to disk also are written back to disk at the same time, even if they were written into the LSA cache at different times. Because data updates are not immediately written to the memory segment and then to disk, data movement can be controlled to reduce seek affinity and improve efficiency.

In a second aspect of the invention, shortly before the space containing an LRU clean track is to be written back and reused, meaning that the logical track is at the bottom of the clean track LRU list, the array controller looks for a number of logically adjacent (within an adjacency definition) clean tracks that are in the LSA cache memory but are not currently stored in contiguous physical disk storage locations. If such tracks are found, the LSA controller recognizes that they may be regrouped and moved out onto disk together because they both are clean, thereby potentially saving disk arm movement in a subsequent read operation. Therefore, the LSA controller moves the LRU clean track and all logically adjacent LSA cache clean and dirty tracks to the memory segment, preferably into the same segment-column of the memory segment. Such movement preferably is performed during disk idle time so as not to interrupt disk operations.

In a third aspect of the invention, regrouping of tracks is performed during a garbage collection process. When a logical segment is the subject of a garbage collection process, all tracks that have not been moved from that segment are read from disk and placed in the memory segment for later writing back to disk. The LSA controller examines every track collected to see if logically adjacent tracks were collected at the same time. If any logically adjacent track is not being collected at the same time, the LSA controller attempts to find the track in the LSA cache. Any logically adjacent track found in the cache is moved to the memory segment, preferably the same segment-column of the memory segment. If all logically adjacent tracks are not found in the LSA cache, then the controller consults the LSA directory, finds the respective disk locations of the tracks, and reads them from disk and places them in the same segment-column or memory segment. In this way, tracks are regrouped during garbage collection.

In yet another aspect of the present invention, the definition of logical adjacency for purposes of regrouping tracks is adjusted to preserve seek affinity. Thus, for reusing clean tracks from the LSA cache memory, during destaging, and during garbage collection, adjacency can be defined in a number of ways and can even be adjusted dynamically to suit the needs of the storage system user. In the special case of garbage collection, different parameters can be used to define logical adjacency for finding tracks in the LSA cache and for finding tracks on disk. Finally, the system can adjust operations based on data set information provided by the host computer at allocation time.

Other features and advantages of the present invention should be apparent from the following description of the preferred embodiment, which illustrates, by way of example, the principles of the invention.

BRIEF DESCRIPTION OF THE DRAWINGS

FIG. 3 is a representation of the LSA directory table of the LSA controller shown in FIG. 1.

DESCRIPTION OF THE PREFERRED EMBODIMENTS

Figure 1:
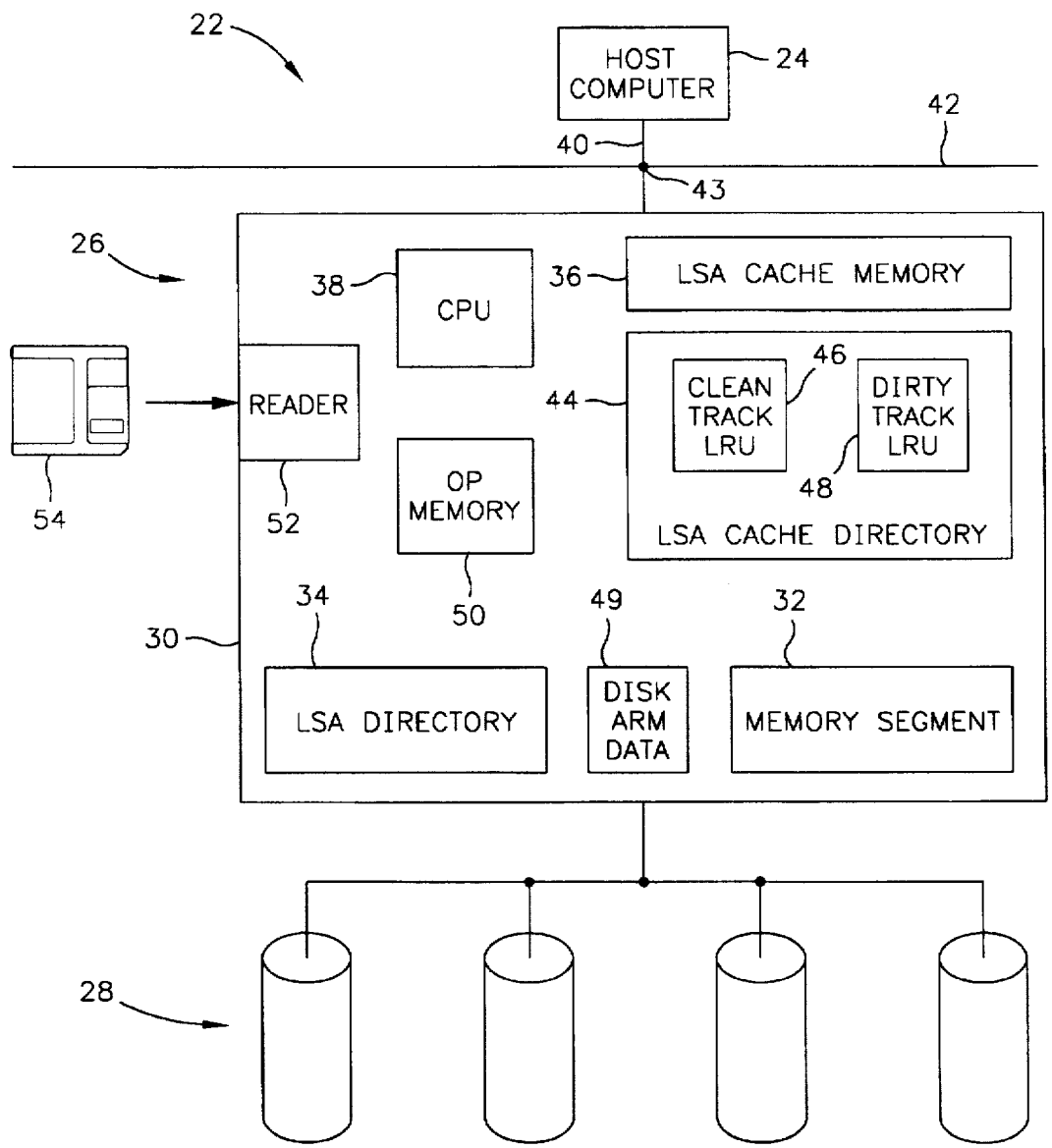
FIG. 1 is a block diagram of a computer system that includes a log-structured array and an array controller constructed in accordance with the present invention.

FIG. 1 illustrates a computer system 22 in which a host computer 24 communicates with a data storage system 26 constructed in accordance with the present invention. The data storage system includes a plurality of direct access storage devices (DASDs) 28 that store data in accordance with a log-structured file format implemented by a log-structured array (LSA) controller 30. In accordance with the log-structured format, the LSA controller includes a memory segment 32, also called a write buffer, in which data received from the host computer 24 for recording into the storage locations of the DASDs 28 is temporarily stored, and includes an LSA directory 34 that contains a mapping of logical track storage locations to physical disk storage locations of the DASDs. The LSA controller 30 of the preferred embodiment also includes an LSA cache memory 36 having substantially greater storage capacity than the memory segment write buffer 32. The LSA cache memory contains both updated logical tracks (comprising "dirty" tracks that contain data received from the host computer 24) and clean logical tracks (the data in the cache is the same as the data on DASD). The LSA controller 30 operates under control of a central processor unit (CPU) 38 that determines when the proportion of the LSA cache memory 36 occupied by updated logical tracks exceeds a predetermined threshold and, in response, moves an updated track and logically adjacent tracks from the LSA cache memory to the memory segment. A track is determined to be a logically adjacent track by logical track number, as described further below.

Because data updates received from the host computer 24 are not immediately written to the memory segment 32 and then back to the storage devices 28, an updated track and all logically adjacent tracks can be grouped together and moved at the same time from the LSA cache memory 36 to the memory segment. This ensures that, if adjacent tracks are updated within some window of time proportional to the size of the LSA cache, they will still be placed contiguously on the storage devices, and no seek affinity will be lost. After being moved to the memory segment, they eventually are written back to disk. The memory segment 32 typically has a storage capacity of one segment's worth of data and the LSA cache memory 36 typically has a storage capacity at least twice that and often ten times or more than that of the memory segment.

Thus, when data comes to the LSA controller 30 for storage, the data first goes to the LSA cache memory 36, where it is possible the data might remain for some time. Because the LSA cache memory is much bigger than the memory segment 32, chances are greater that multiple tracks will not have been written to disk before they are read. Disk arm movement is therefore reduced. Also, because tracks are in LSA cache memory, it is more likely that adjacent tracks will be found there also when one of them is pushed out. Subsequent read operations from disk do not have to move the disk arm as much.

As described further below, to move data from the LSA cache memory 36 to the memory segment 32, the LSA controller 30 looks for a sequential pattern in the cache. For each logical track to be moved, the controller looks for adjacent or sequential tracks. If sequential tracks are in the LSA cache memory, then they are taken out together at the same time, even though they might have been written at different times.

The LSA controller 30 communicates with the host computer 24 over a data communication bus 40. The data bus may comprise, for example, an industry-standard Personal Computer (PC) communication interface, such as the so-called Small Computer Standard Interface (SCSI), a "Microchannel" communication bus such as provided by the International Business Machines Corporation (IBM Corporation), or the like. The host computer 24 and data storage system 26 also can be connected to a data network 42, such as a local area network (LAN), through a network interface 43 to facilitate communication with other host computers or storage systems.

To keep track of the contents in the LSA cache memory 36, the LSA controller 30 includes an LSA cache memory directory 44 comprising a "clean track" least-recently-used (LRU) list 46 and a "dirty track" least-recently-used (LRU) list 48. Each LRU list can be thought of as being ordered so that the least recently used track of each respective list is at the bottom of the list and the most recently used track is at the top of the list. In the preferred embodiment, the LRU lists 46, 48 are doubly-linked lists, as described further below. In accordance with the invention, when an updated logical track is moved from the LSA cache memory 36 to the memory segment 32, the updated tracks logically adjacent to the updated track also are moved from the LSA cache to the memory segment, regardless of where the adjacent updated tracks are in the LRU list.

The LSA controller CPU 38 performs its functions by executing instructions stored in an operating memory 50. The operating memory 50 can be loaded with the instructions through an optional program storage reader 52 of the LSA controller 30 or through an interface with the network 42. The program storage reader permits a program product storage device 54, such as a magnetic disk, to be received and for program steps recorded on the program product storage device to be read and transferred into the operating memory 50. In this way, the processing steps necessary for operation in accordance with the invention can be embodied on a program product such as the program product storage device 54. Other suitable program product storage devices can include magnetic tape, optical disk, and semiconductor memory. Alternatively, the program steps can be received into the operating memory 50 over the network 42 through the network interface 43.

Figure 2:
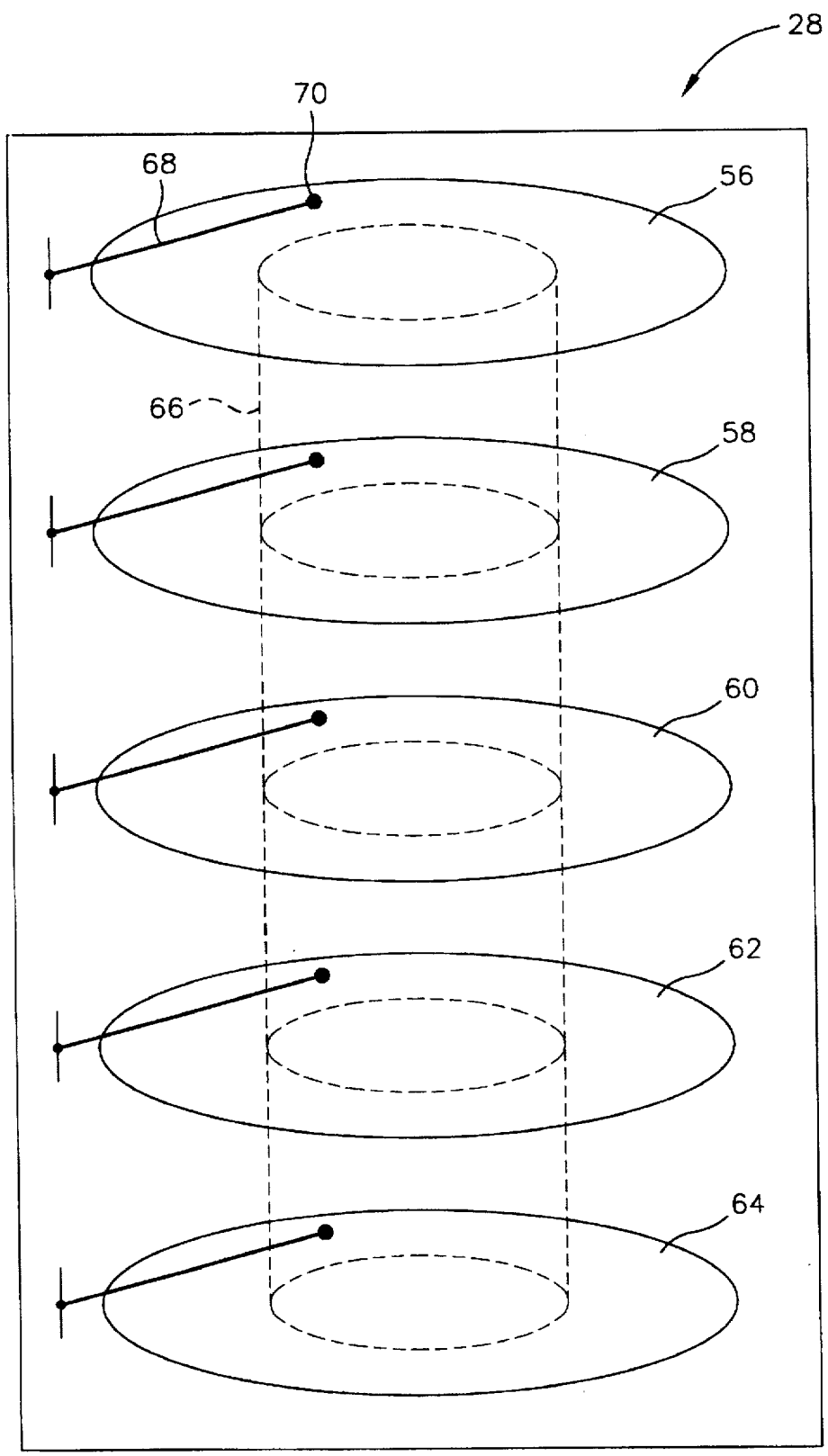
FIG. 2 is a graphical representation of one of the disk drive units shown in FIG. 1.

In the preferred embodiment, each of the four DASD units 28 illustrated in FIG. 1 comprises a disk drive storage device having multiple disk platters. FIG. 2 represents a single one of the disk drive units 28 having five disk platters 56, 58, 60, 62, and 64. It should be understood that each of the four disk drive units has a similar construction. Data is recorded in concentric tracks (or alternatively in spiral tracks) on one or both surfaces of each platter. Each track on a disk platter is comprised of a group of radial sectors, also called blocks. Each block can contain multiple byte lengths of data, called records.

A logical segment-column can be defined as an arbitrary number of contiguous tracks, where tracks are numbered sequentially. For example, if a disk drive unit has five platters, it might be desirable to define five tracks to be a segment-column. Then, a single disk drive unit would include as many logical segment-columns as there are tracks on a single platter. Segment-columns on each of the disk platters could be grouped together to define a segment. A single-track segment-column is graphically represented in FIG. 2 by the dashed line 66 that extends across each of the disk platters. One segment is defined to include as many segment-columns as there are DASDs. For example, a segment might comprise all the segment-columns corresponding to the track numbered "20" on each of the four disk drive units 28 depicted in FIG. 1. Data is stored into a segment (recorded onto the platters) by disk arms 68 having magnetic heads 70. One disk arm is depicted in FIG. 2 for each recording surface of a platter.

FIG. 3 is a representation of the LSA directory 34 that maps logical tracks maintained by the LSA controller 30 to physical track locations of the disk drive units 28. As noted above, the LSA directory contains the current physical disk location of each logical track. FIG. 3 shows that, for each logical disk and track location, the LSA directory 34 contains the physical location to which the logical track is mapped. The physical location is specified by disk drive unit (physical device) number, segment-column number within the disk drive unit, starting sector within the segment-column, and the length of the logical track.

When a request to read a logical track is received by the LSA controller 30, the controller CPU 38 checks the LSA cache memory 36 to determine if the requested data is in the LSA cache. If it is, the data is provided to the host computer 24 from the cache. If the data is not in the LSA cache, the controller CPU 38 examines the LSA directory 34 to determine the disk drive unit, starting sector number, and length in sectors to which the logical track is currently mapped, and then reads the relevant sectors from the specified disk drive unit.

To store data from the host computer 24 into the LSA 26, the LSA controller 30 maintains the memory segment 32 such that it contains the same number of segment-columns as there are disk drive units, allowing for data storage and parity storage. For example, if the array 26 includes four disk drive units, then the storage locations of the memory segment 32 will be organized into four segment-columns, comprising three segment-columns into which data is stored and one segment-column into which parity information is stored. Thus, for a disk array having N+1 disk drive units, the memory segment will contain N data segment-columns and one parity segment-column.

Figure 4:
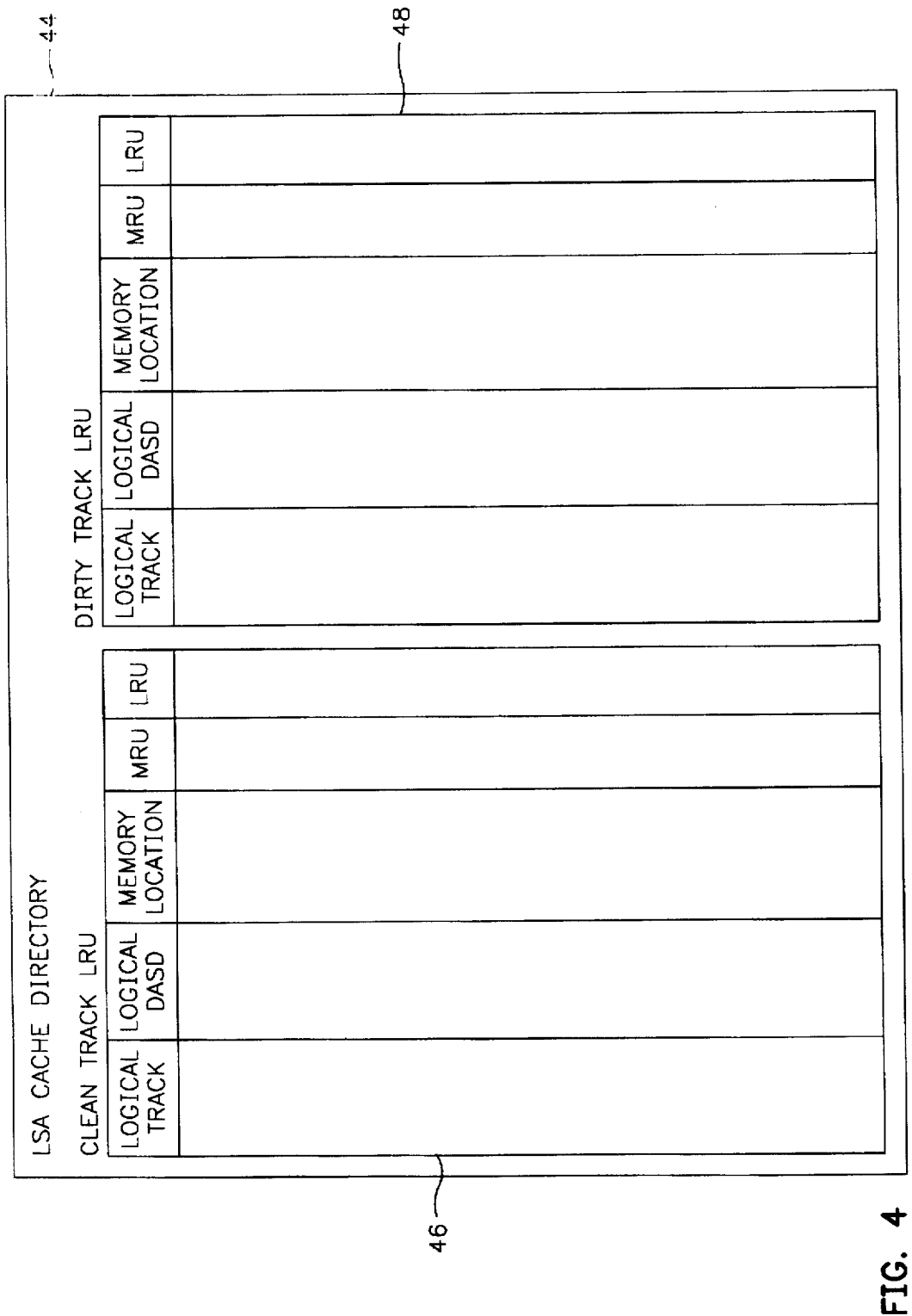
FIG. 4 is a representation of the LSA cache memory table of the LSA controller shown in FIG. 1.

FIG. 4 is a representation of the LSA cache directory 44, showing that the cache directory includes a clean track LRU list 46 and a dirty track LRU list 48. FIG. 4 shows that each LRU list includes entries for logical track number, logical storage device number, and the corresponding cache memory location. It should be noted that the lists are doubly-linked lists, in that each entry includes a column entry pointing to the next most recently used (MRU) track and includes a column entry pointing to the next least recently used (LRU) track. Each list also includes one head of list pointer (for the top of the list) and one tail of list pointer (for the bottom of the list). A clean track represents a track where the values stored in the cache are the same as the values stored in the disk. The dirty tracks are those tracks with superseded data. The LRU list entries point to the cache memory locations containing the data.

Figure 5:
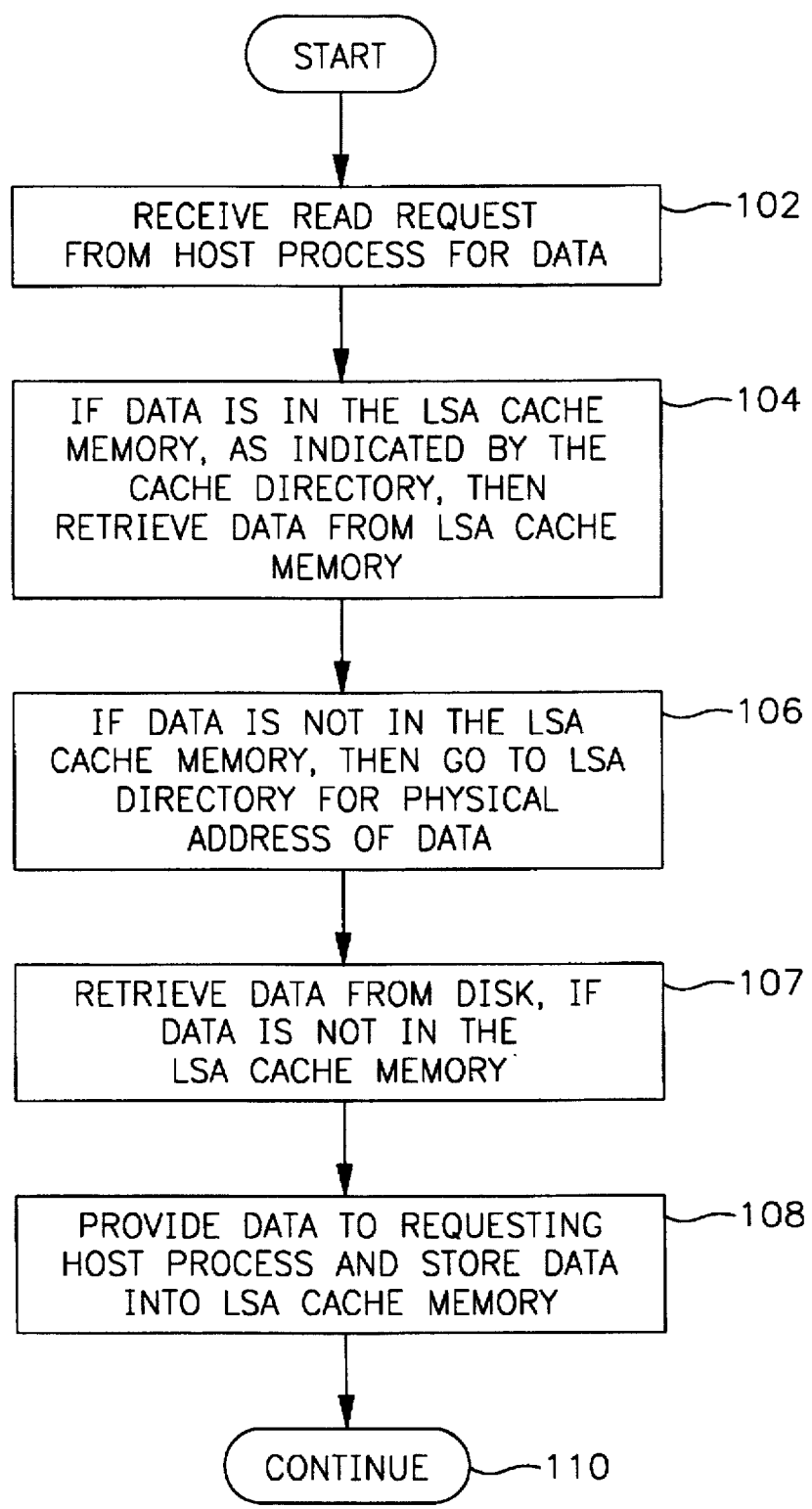
FIG. 5 is a flow diagram that illustrates the operating steps executed by the LSA controller illustrated in FIG. 1 in responding to data read requests.

The operation of the data storage system 26 will be more apparent with reference to the flow diagrams illustrated in FIGS. 5-10. FIG. 5 shows the operating steps executed by the LSA controller 30 in processing read requests. Application processes of the host computer 24 generate requests for data, which are sent to the data storage system. The first step, indicated by the flow diagram box numbered 102, is for the read request to be received from the host computer process. The flow diagram box numbered 104 indicates that the next step is for the LSA controller to retrieve the requested data from the LSA cache memory if the requested data is in the cache memory. The LSA controller will know a requested data is in the cache memory if the LSA cache directory contains an entry for the data.

If the data is not listed in the cache memory directory, as indicated by the next flow diagram box 106, then the LSA controller examines the LSA directory for the physical address of the data. When the controller has the physical address, it then retrieves the data from the disk drive storage devices, as indicated by the flow diagram box 107. Whether the data is retrieved from the LSA cache memory or from the physical location on the disk devices, the last step in processing a read request, as indicated by the flow diagram box numbered 108, is to provide the data to the requesting host process. If the data is retrieved from the disk devices, then the data also is stored into the LSA cache memory. In this way, the number of disk accesses in satisfying future data requests is reduced. The processing then continues as indicated by the continue box 110.

Figure 6:
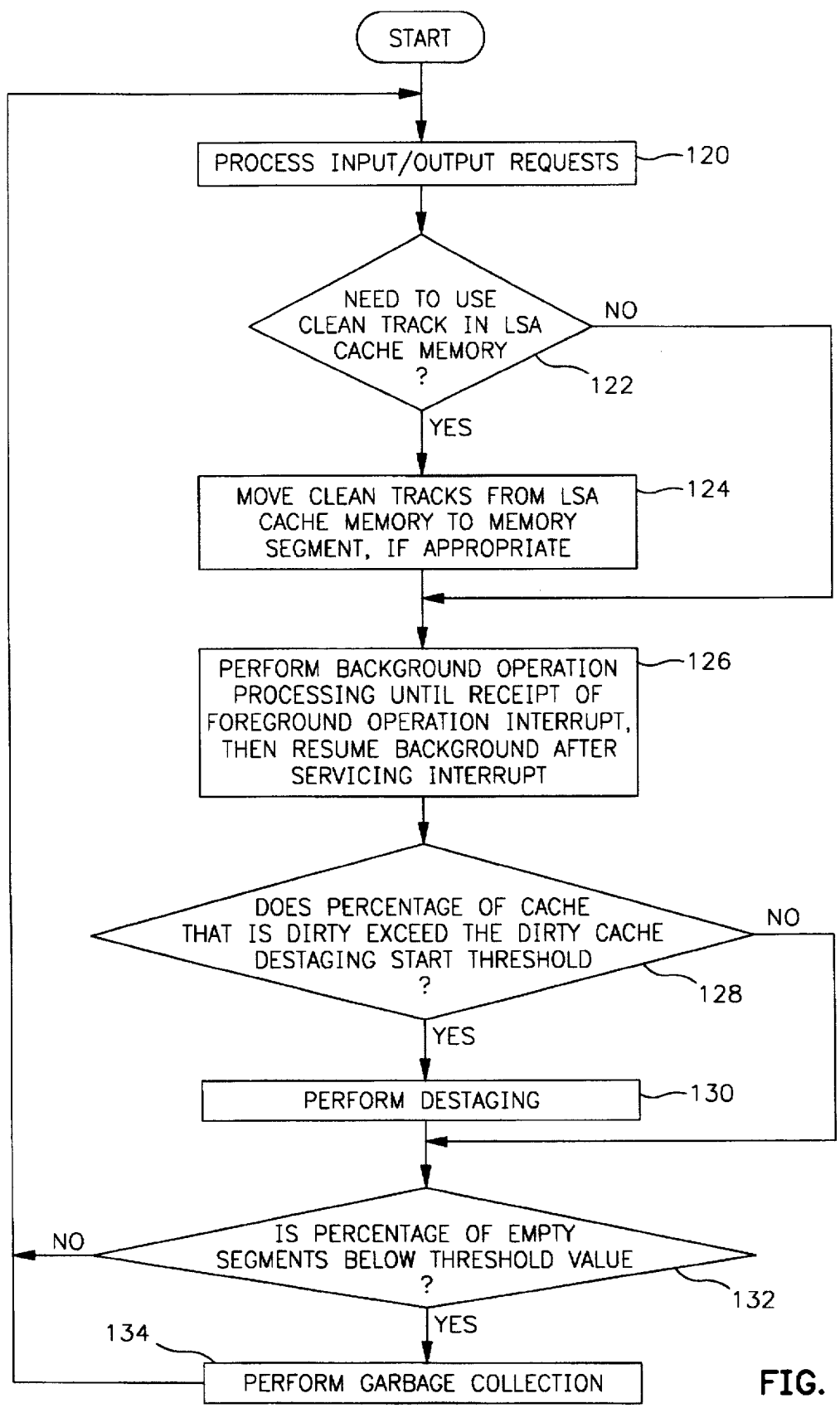
FIG. 6 is a flow diagram that illustrates the operating steps executed by the LSA controller illustrated in FIG. 1 in managing data storage movement from the LSA cache memory to the LSA memory segment.

FIG. 6 is a flow diagram that illustrates the operating steps executed by the LSA controller in managing data storage and maintaining data movement from the LSA cache memory to the memory segment. FIG. 6 represents input/output operating requests, referred to as foreground operating requests, by the flow diagram box numbered 120. Such requests are generated by the host computer for data, such as illustrated by the operating steps of FIG. 5. As part of its operation in performing data movement between the LSA cache memory, memory segment, and the storage devices 28, the LSA controller periodically will find that it needs to use a clean track in the LSA cache memory to make room for incoming data from the host computer or from the disk devices. This step is represented by the decision box numbered 122.

If the LSA controller needs to use a clean track in the LSA cache memory, an affirmative outcome at the decision box 122, then the LSA controller moves clean tracks from the LSA cache memory to the memory segment, if appropriate. This processing step is indicated by the flow diagram box numbered 124 and is described in greater detail below. Next, the flow diagram box numbered 126 in FIG. 6 indicates that background operations are conducted by the LSA controller. Such background operations are carried out when the LSA controller is not otherwise actively involved in satisfying a data request from the host computer. For example, such background operations include system operation statistical calculations, overhead processing, and the next few FIG. 6 flow diagram boxes to be described. In particular, the background operations represented by the flow diagram boxes numbered 126 through 134 are performed only until an interrupt request is received for a foreground operation such as an input/output request. The interrupted background operation is returned to after the foreground operation is completed.

One of the background processing operations carried out by the LSA controller, as indicated by the flow diagram box numbered 128, is for the LSA controller to determine if the percentage of LSA cache memory that is occupied by dirty tracks exceeds a dirty cache threshold value. If the percentage of dirty cache exceeds the threshold value, an affirmative outcome at the decision box 128, then the LSA controller performs a destaging operation, indicated by the flow diagram box 130. The exact percentage value sufficient to trigger the destaging operation will depend on the particular implementation of the data storage system. Such a value can be determined experimentally. The destaging operation comprises writing the dirty tracks (having updated values) back to the disk storage devices, the details of which should be well-known to those skilled in the art without further explanation.

After the destaging operation, and also if the dirty cache threshold was not exceeded, background processing continues with the decision box 132, at which the LSA controller determines if the percentage of empty segments in the LSA cache is below a predetermined threshold value of the system. An affirmative outcome indicates that the LSA controller should perform a garbage collection process, as indicated by the flow diagram box numbered 134. Those skilled in the art will appreciate that garbage collection involves the compacting of empty segments so that data can be stored in a smaller number of segments after garbage collection, as described above in the Background of the Invention section. After garbage collection, or if garbage collection was not needed, the LSA controller processing continues with responding to any host computer data request operations, as indicated by the flow diagram path from box 134 back to the operation box 120. If there are no operations to carry out, then additional background processing at box 126 can be carried out.

In accordance with the present invention, the LSA storage system illustrated in FIG. 1 attempts to preserve seek affinity by regrouping tracks when destaging from the LSA cache memory occurs, when clean tracks in the LSA cache are reused, and when garbage collection is performed. These operations will next be described in greater detail. Moreover, as described further below, such operations are subject to even greater optimization by adjusting the definition of logical adjacency.

Figure 7:
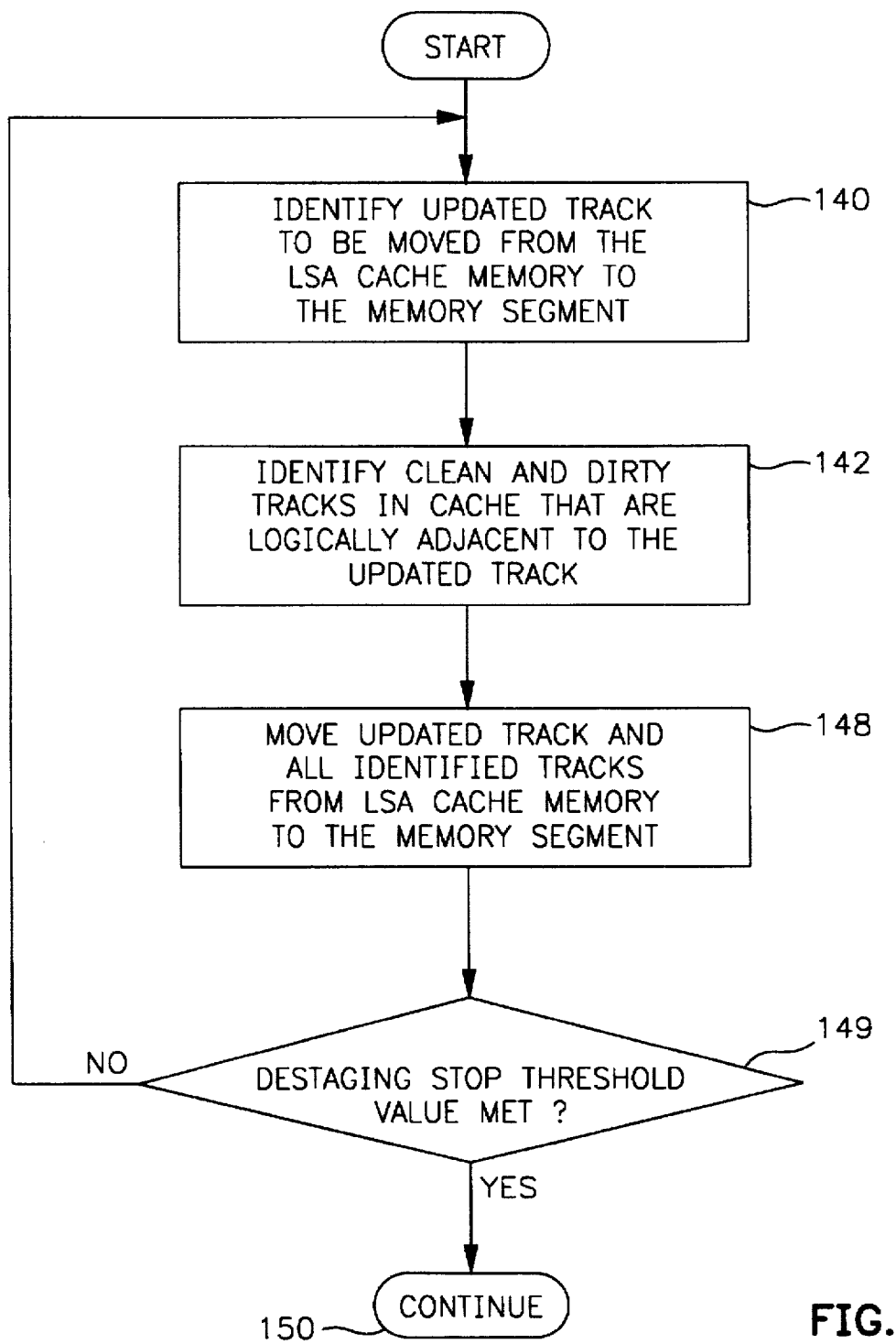
FIG. 7 is a flow diagram that illustrates the operating steps carried out by the LSA controller illustrated in FIG. 1 in carrying out the destaging (writing) operation of FIG. 6.

The destaging operation indicated by the flow diagram box numbered 130 in FIG. 6 is illustrated in greater detail by the FIG. 7 flow diagram. As noted above, destaging is begun if the percentage of dirty tracks exceeds a start threshold value. The first step of the destaging operation, indicated by the FIG. 7 flow diagram box numbered 140, is to identify an updated track to be moved from the LSA cache memory to the memory segment. Typically, the updated track to be moved is the bottom track entry in the dirty track LRU list. The identification can occur, for example, by setting a flag associated with each track entry of the cache memory.

The next step is to identify clean and dirty tracks that are logically adjacent to the updated track to be moved, as indicated by the flow diagram box numbered 142. As described further below, the definition of logical adjacency can be adjusted. Next, as indicated by the decision box numbered 148, the LSA controller will move all the identified tracks from the LSA cache memory to the memory segment. Thus, the identified tracks will include the updated track to be moved, adjacent updated tracks, and also any adjacent clean tracks that were identified. After the identified tracks have been moved, the LSA controller determines if the percentage of dirty tracks is less than a stop threshold value, as represented by the decision box numbered 149. A negative outcome indicates that the percentage of dirty tracks is too high and destaging continues at the flow diagram box numbered 140. An affirmative outcome indicates that destaging can halt and other processing can continue, as represented by the continuation box numbered 150.

Figure 8:
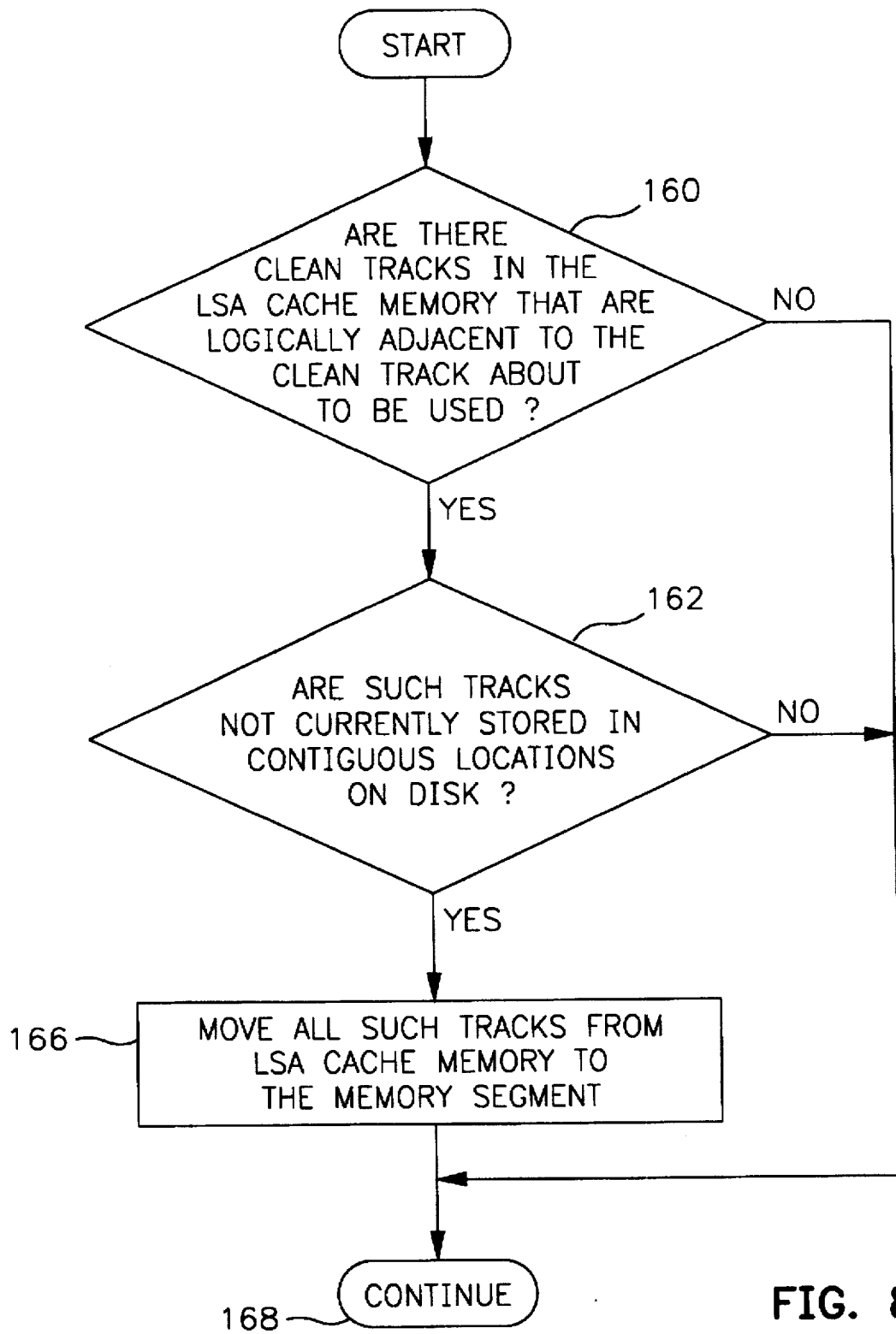
FIG. 8 is a flow diagram that illustrates the operating steps carried out by the LSA controller illustrated in FIG. 1 in moving clean tracks from the LSA cache memory to the LSA memory segment, shown in FIG. 6.

FIG. 8 illustrates in greater detail the operating steps followed by the LSA controller in moving clean tracks from the LSA cache memory to the memory segment, the step indicated by the flow diagram box numbered 124 in FIG. 6. In this aspect of preserving seek affinity by regrouping tracks, the LSA controller attempts to gather clean tracks together whenever clean tracks are written to disk. Thus, whenever the LSA controller needs to reuse space occupied in the LSA cache memory by a track located at the bottom of the clean track LRU list, the controller first checks to see if there are a threshold number of other clean tracks in the LSA cache that would be considered logically adjacent to the located clean track. If no logically adjacent tracks are found in the LSA cache memory, then no further action is necessary. If there are a sufficient number of logically adjacent clean tracks, then the LSA directory is checked to see if the adjacent tracks are physically stored near each other. If they are, no further action is necessary. If they are not, the clean track and all clean or dirty adjacent tracks are moved from the LSA cache into the memory segment.

The first step in such processing is to identify a clean track that is to be used and determine if there are clean tracks in the LSA cache memory logically adjacent to the track to be used, as indicated by the decision box numbered 160 in FIG. 8. Typically, the clean track to be used is the bottom track of the clean track LRU list. If there are such adjacent clean tracks, an affirmative outcome at the decision box 160, then the LSA controller next determines if such tracks are not currently stored in contiguous physical locations on the storage devices, as indicated by the decision box numbered 162.

If there were clean tracks adjacent to the track being moved (affirmative outcome at decision box 160) and if such tracks were stored in contiguous locations on disk (affirmative outcome at decision box 162), then the LSA controller identifies the clean track and the adjacent clean tracks and moves them from the LSA cache memory to the memory segment, as indicated by the flow diagram box numbered 166. As before, the identification can comprise setting a flag associated with each track entry in the LSA cache memory. Operation continues with the continuation box 168, returning to the box numbered 128 in FIG. 6. If the outcome at either decision box was negative, then no tracks are moved out from the LSA cache memory.

As noted above, the definition of logical adjacency can be adjusted to better preserve seek affinity. The definition of logical adjacency for purposes of track movement out of the LSA cache memory can be an arbitrary assignment of tracks from segment-colas. For example, the first group of k tracks can be defined to be in one adjacency group, the next group of k tracks can be defined to be in the next adjacency group, and so forth. Two tracks are then said to be adjacent only if they are in the same adjacency group. Tracks alternatively can be defined to be adjacent if they are located within a predetermined number of tracks of each other. In another aspect of the invention described further below, the adjacency definition is dynamically changed by the LSA controller using information from the host computer.

Thus, one way the present invention defines logical adjacency is to first define adjacency groups. For example, a first adjacency group might comprise the first twenty logical tracks of the first logical device, a second adjacency group might comprise the next twenty logical tracks of the first logical device (tracks 21–40), a third group might comprise the next twenty (tracks 41–60), and so forth. A logical track would then be adjacent to another if they are both in the same adjacency group. Each logical device would have several adjacency groups. Another way to define adjacency is to examine the logical track numbers. Two tracks then would be logically adjacent if they are within a predetermined number of logical tracks of each other.

Figure 9:
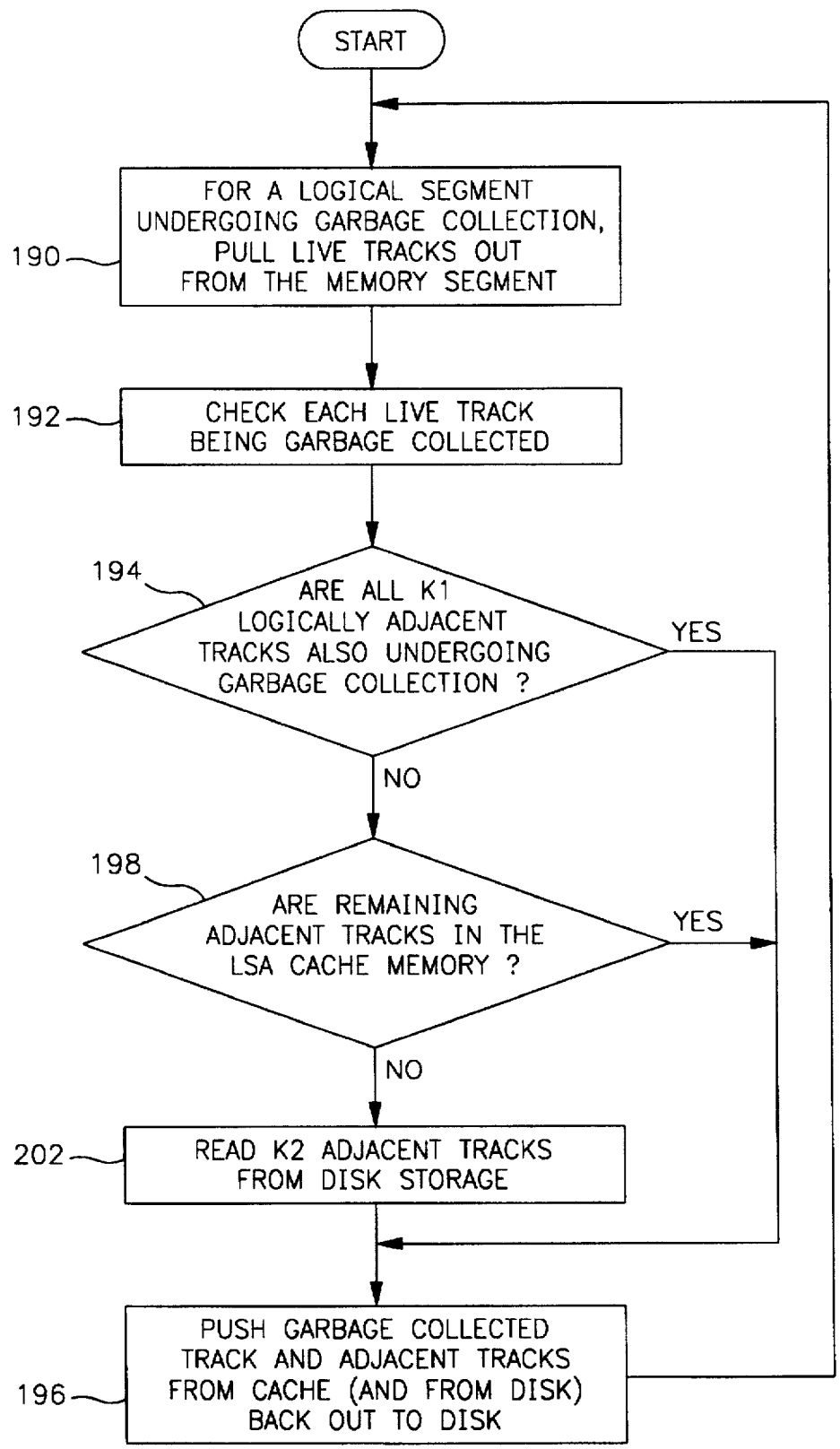
FIG. 9 is a flow diagram that illustrates the operating steps carried out by the LSA controller illustrated in FIG. 1 in performing the garbage collection operation of FIG. 6.

FIG. 9 illustrates the operating steps carried out by the LSA controller in performing the garbage collection step indicated by the flow diagram box numbered 134 in FIG. 6. In the first step of garbage collection, indicated by the FIG. 9 flow diagram box numbered 190, for a logical segment in the cache memory that is undergoing garbage collection, the LSA controller reads from disk storage the tracks that have not been moved from that segment and places them in memory, for later writing back to disk. As described above, such tracks are commonly referred to as "live" tracks. The memory to which the tracks of the garbage collected segment are moved can be a temporary garbage collection buffer area or can be the memory segment. If the tracks are first moved to a temporary garbage collection buffer, then they must be moved from the buffer to the memory segment before they are written back to disk. Next, the LSA controller checks the tracks undergoing garbage collection for adjacency to determine if regrouping of tracks can occur. The LSA controller checks each track in turn, meaning the track that is moved from the LSA cache memory into the garbage collection memory, as indicated by the flow diagram box numbered 192.

The LSA controller next determines if there are any cache memory tracks logically adjacent to the garbage collected track that are also being garbage collected at the same time. For this purpose, tracks in the LSA cache memory are considered logically adjacent if they are within k1 tracks of each other. This step is represented by the FIG. 9 decision box numbered 194. If all k1 logically adjacent tracks are being garbage collected at the same time, an affirmative outcome at the decision box 194, then the LSA controller pushes them out to the memory segment. Pushing the tracks out is represented by the flow diagram box numbered 196. If a logically adjacent track is not being garbage collected, a negative outcome at the decision box numbered 194, then the LSA controller attempts to find it in the LSA cache memory. The attempt to find the track is represented by the decision box numbered 198. For this purpose, tracks are considered logically adjacent if they are within k2 tracks of each other. If a logically adjacent track not being garbage collected is found in the LSA cache, an affirmative outcome, then the LSA controller pushes it out to the memory segment, preferably in the same segment-column. Pushing the logically adjacent track out, or recording it from the LSA cache into the memory segment with the other garbage collected track, is represented by the flow diagram box numbered 196. LSA controller processing then continues operation with the next track being garbage collected, as indicated by the return of processing to the box 190.

If all of the logically adjacent tracks to the track being garbage collected from the LSA cache memory are not being garbage collected at the same time, and are not found in the LSA cache, then at the flow diagram box numbered 202 the LSA controller consults the LSA directory to find their disk locations and reads them from disk. In accordance with the preferred embodiment, tracks on the disk locations are considered to be logically adjacent if they are within a number k2 of tracks. The LSA controller then places the disk-read logically adjacent tracks, along with any logically adjacent LSA cache tracks, in the same memory segment-column or memory segment with the garbage collected track, as indicated by the flow diagram box numbered 196. Garbage collection then continues at box 190.

This garbage collection regrouping of tracks is contrary to conventional garbage collection practice, which ordinarily pulls tracks only from the memory segment. In accordance with the present invention, garbage collection can pull tracks from the memory segment and also from the novel LSA cache memory and from the disks themselves to regroup the tracks and preserve seek affinity. As described next, the definition of logical adjacency can be adjusted to further preserve seek affinity and improve operation.

Regrouping tracks during garbage collection further improves the seek affinity performance measure. Because finding logically adjacent tracks via the LSA directory and reading them from disk consumes greater resources than finding the logically adjacent tracks in the LSA cache memory, it might be desirable to use different criteria to perform the two operations. In such a case, the two different parameters k1 and k2 can be used to differentially define which logically adjacent tracks will be searched for in the cache and which tracks will be searched for on disk. The first parameter, called k1, is used for defining logical adjacency for purposes of LSA cache memory searches. The second parameter, called k2, is used for defining logical adjacency in the disks. For example, if k1=15 and k2=5, then logical tracks that are written within ±15 tracks of a garbage collected track would be searched for in the LSA cache memory, but only tracks written within ±5 tracks of the garbage collected track will be searched for from disk. If k2=0, then the LSA controller searches for adjacent tracks only in the LSA cache, and not from disk.

The k1 definition and usage described above can be used globally in the storage system illustrated in FIG. 1. That is, k1 is used for defining logical adjacency in moving clean tracks (as described above in conjunction with FIG. 8) and in destaging (as described above in conjunction with FIG. 7), as well as in garbage collecting, and whenever a logical adjacency test is made.

In addition, the k1 and k2 values can be dynamically adjusted in an attempt to match variations in the workload, as seen by the LSA controller. The processing to be described next occurs primarily during background operations, such as represented by the flow diagram box numbered 126 in FIG. 6. This ensures minimal impact on data movement processing.

For dynamic adjustment of k1 and k2, the LSA controller maintains two statistical measures, called S and S', that it uses to make the adjustments. The measure S is equal to the average read seek distance experienced in the LSA. The measure S' is the average seek distance expected for a traditional (that is, non-LSA) disk storage system operating on the same workload experienced by the LSA controller.

The measure S is calculated by maintaining the arm position of every disk drive unit in the LSA assuming only the read requests. That is, all destaging/write requests to the disks are ignored in calculating the disk arm positions for the measure S. For each read request, seek distance is calculated as the absolute value of the difference between the current arm position and the new arm position as determined by the read request. The average seek distance is calculated and maintained as the measure S. The measure S', the average seek distance expected for a non-LSA disk storage system operating on the same workload experienced by the LSA controller, is calculated ignoring write requests. It would be expected that the measure S' should be lower than the measure S because read requests in conventional disk storage systems typically require less disk arm movement. The adjustments to k1 and k2 are made in an attempt to drive the measure S for the LSA system to be as close to the measure S' as possible.

In calculating the measure S', the LSA controller assumes that the logical tracks are mapped to the disks in a static configuration where logically adjacent tracks are physically adjacent. With this assumption, the average seek distance is calculated for read requests only, ignoring destaging requests. Because reliable seek data may take some time to accumulate after the LSA is initially started, the LSA controller begins operation with estimates for k1 and k2 and waits for a relatively large (predetermined) number of read requests before calculating S and S'. A sufficient number of read requests might be, for example, 100 000 read requests.

After the large number of read requests and the calculation of S and S', the LSA controller compares the two. If S is less than or equal to S', then the LSA controller increases k1 and k2 by a predetermined amount. If S is much larger than S', larger by a predetermined proportion, then the LSA controller increases k1 and k2 by a larger predetermined amount. After making the changes to k1 and k2, the LSA controller resets S and S', lets the LSA system operate for an additional number of read requests (another 100 000), and then recalculates S and S' for the second group of read requests. The LSA controller continues in this fashion, calculating S and S' at every interval of predetermined read requests and adjusting k1 and k2. The predetermined amount of k1 and k2 increases, the S/S' difference necessary to trigger larger increases of k1 and k2, and even the number of read requests before S and S' calculation, can be experimentally determined based on operating experiences for the LSA system.

As an alternative, rather than using average seek distances for the S and S' calculation, the LSA controller can use average disk arm seek time. Using average seek times more closely resembles the common performance measure of seek affinity and might more accurately account for operating inefficiencies from read activity, because seek times do not linearly increase with seek distance. As noted above, processing for such dynamic adjustment of adjacency preferably occurs during background processing, as represented by the flow diagram box numbered 126 on FIG. 6.

Thus far, the LSA controller 30 described above can maintain seek affinity if the storage system receives no help from the host computer 24. Performance can be improved, however, if the LSA controller is provided with information on the data set or file at the time the host computer operating system allocates space for that data set or file. Information about the set of logical tracks that comprise the data set can be passed to the LSA controller at allocation time by the host computer. The information passed includes an ordered list of logical tracks comprising the tracks in the data set. It should be noted that consecutively numbered logical tracks are not necessarily tracks that are adjacent on any storage device 28, but they are adjacent tracks from the perspective of the data set specified by the host computer. For example, a data set might be stored on logical tracks called L1 and L2, where a logical track L1 might be the first logical track of the first logical device and a logical track L2 might be the one-hundredth logical track of the second logical device. Ordinarily, however, two consecutively numbered logical tracks can be expected to be adjacent tracks on the same logical device, rather than on difference logical devices.

In the embodiment where the LSA controller 30 receives data set information, the host computer 24 sends information about the tracks comprising the data set to the LSA controller whenever there is a change in such information. Such changes occur when the data set is extended or enlarged, when the data set is reduced in size, when the data set is deleted, and so forth. The LSA controller preferably maintains information about data sets in the LSA operating memory 50. In particular, the LSA controller maintains an ordered list of tracks that comprise each data set. In this embodiment of the invention, this information is used to improve performance by helping the LSA controller 30 to identify logically adjacent tracks. That is, the definition of adjacency is modified in accordance with the information received from the host computer 24.

In the embodiments discussed above, a logical track L 1 was defined to be logically adjacent to another logical track L2 if L2 was within a range of plus or minus a threshold value within the location of L1, or if both L1 and L2 belonged to the same logical adjacency group. Utilizing the data set track information described above, the LSA controller alternatively can define logical adjacency so that a logical track L1 is logically adjacent to a logical track L2 if both L1 and L2 belong to the same data set and if they are within a predetermined number of positions of each other in the ordered list of tracks that make up the data set. The remainder of the processing steps followed by the LSA controller 30 are the same as described above, and particularly as illustrated in FIGS. 5-9.

A further refinement of the invention can be implemented if the host computer 24 informs the LSA controller 30 about future intended access patterns. For example, the host computer may provide information about the intended access pattern at the time a data set is opened or allocated. One particular access pattern of interest would be a sequential read access pattern. The operation of the LSA controller would then be changed as follows. The movement of clean tracks from the LSA cache memory 36 to the memory segment 32 illustrated in FIG. 7, would be carried out only if the track being moved to the memory segment belongs to a data set that is likely to be read sequentially in the near future. The moving of clean tracks from the LSA cache memory, illustrated by the flow diagram of FIG. 8, would be performed only if the clean track being reused belongs to a data set that is likely to be sequentially read in the near future. Finally, the part of the garbage collection process illustrated by the flow diagram of FIG. 9 would be performed only if the track undergoing garbage collection belongs to a data set that is likely to be sequentially read in the near future.

Figure 10:
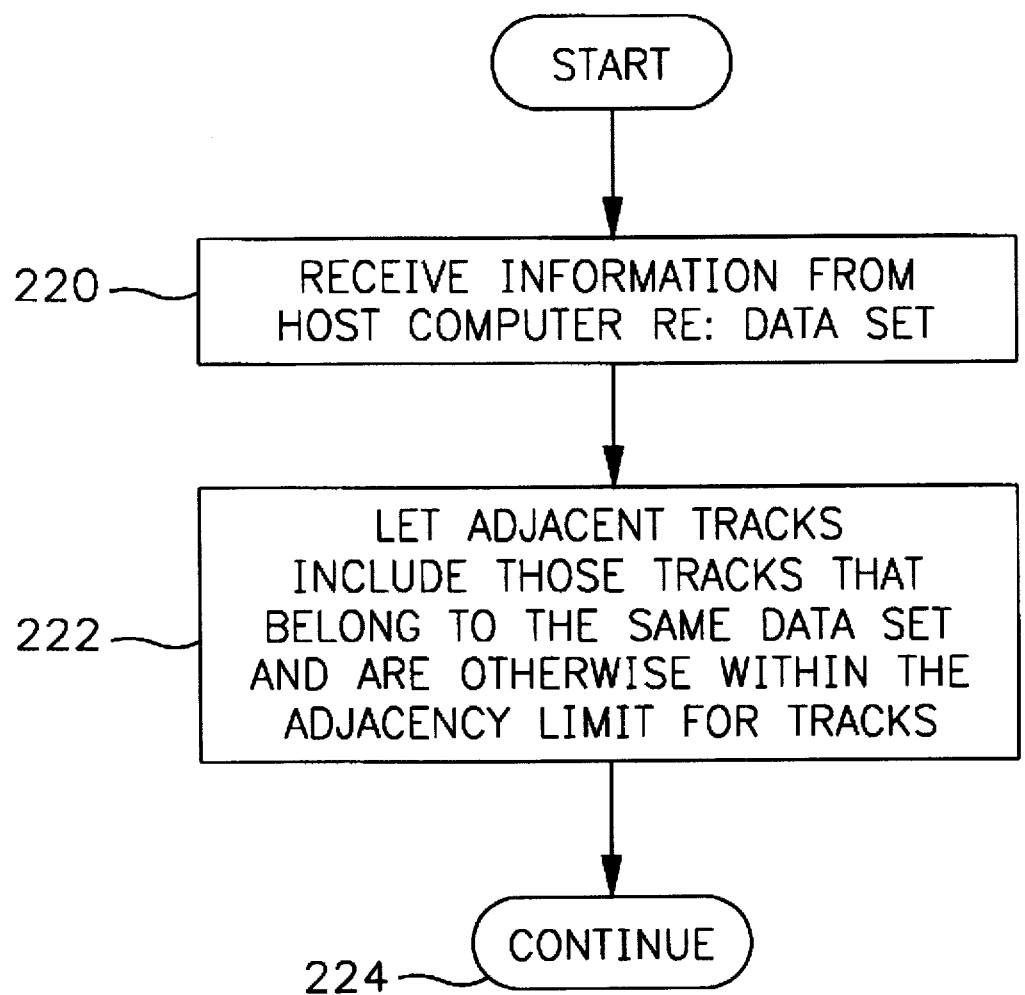
FIG. 10 is a flow diagram that illustrates the modified definition of adjacency used by the LSA controller of FIG. 1 when utilizing data set information from the host computer.

The operation of the LSA controller 30 if receiving information from the host computer, as described immediately above, is illustrated in the flow diagram of FIG. 10. Processing begins with receipt of information from the host computer, as indicated by the flow diagram box numbered 220. The flow diagram box numbered 222 indicates processing in which the adjacency definition is revised to comprise tracks that belong to the same data set and also are within an adjacency limit for adjacent tracks. Processing steps otherwise described above resume with the continuation box numbered 224. That is, the remainder of the processing steps followed by the LSA controller 30 are the same as described above, and particularly as illustrated in FIGS. 5-9.

The invention described above describes a storage system that reduces disk arm motion needed to record and retrieve data from a log structured disk storage array (LSA) by providing a LSA cache memory in addition to the conventional memory segment of LSA controllers. Thus, in the described data storage system, data received for storage first goes to the LSA cache memory, where it is possible the data might remain for some time. Because the data storage system contains an LSA cache memory much bigger than the LSA memory segment, chances are greater that multiple tracks will not have been written to disk before they are read, and disk arm movement is therefore reduced. Moreover, two tracks will get written to disk together and then will be read back together. Performance is further improved by regrouping logical tracks whenever movement occurs between the LSA cache and memory segment.

The present invention has been described in terms of presently preferred embodiments so that an understanding of the present invention can be conveyed. There are, however, many configurations for log-structured storage array controllers not specifically described herein but with which the present invention is applicable. The present invention should therefore not be seen as limited to the particular embodiments described herein, but rather, it should be understood that the present invention has wide applicability with respect to storage array controllers generally. All modifications, variations, or equivalent arrangements that are within the scope of the attached claims should therefore be considered to be within the scope of the invention.

We claim:

1. A storage system comprising:

a plurality of direct access storage devices, each having one or more disk platters with tracks of storage locations into which data is recorded and from which data is retrieved by disk arms according to a log structured architecture such that a group of storage locations comprising a segment column from each storage device comprises a segment's worth of data storage;

a memory segment in which data received from a host computer for recording into the storage locations of the storage devices is temporarily stored, the memory segment having a storage capacity of approximately one segment;

a log structured array (LSA) directory containing a mapping of logical track storage locations to disk storage locations;

an LSA cache memory having substantially greater storage capacity than the memory segment, in which updated logical tracks of data from the host computer and clean logical tracks from the storage devices are stored; and a control processor that receives data read requests from the host computer and, in response, first checks the LSA cache memory to find the requested data, then checks the memory segment, and then checks the storage devices; wherein:

the control processor determines when the memory segment is full and in response moves data in the memory segment into corresponding disk storage locations, and periodically moves an updated track and logically adjacent tracks from the LSA cache memory to the memory segment; and the control processor periodically moves a live track in a logical segment from the direct access storage devices to the memory segment, determines tracks in the same logical segment that are logically adjacent to the live track, identifies the logically adjacent tracks that are in the LSA cache memory, identifies the logically adjacent tracks not in the LSA cache memory but in the direct access storage devices, retrieves the identified logically adjacent direct access storage device tracks, and moves the live track, the identified LSA cache memory tracks, and the retrieved tracks to the memory segment.

2. A storage system as defined in claim 1, wherein the control processor uses a first criterion to determine that a track in the same logical segment is logically adjacent to the live track and to determine that a track in the LSA cache memory is logically adjacent to the live track, and uses a second criterion to determine that a track not in the LSA cache memory but in the direct access storage devices is logically adjacent to the live track.

3. A storage system as defined in claim 1, wherein the control processor determines that a track is logically adjacent to the updated track being moved if the logically adjacent track is located within a predetermined number of logical tracks from the updated track.

4. A storage system as defined in claim 1, wherein the control processor determines that a track is logically adjacent to the updated track being moved if the logically adjacent track is located in a predetermined adjacency group that also includes the updated track.

5. A storage system as defined in claim 1, wherein the control processor receives data set information from the host computer wherein the control processor receives data for recording into the storage devices, determines the set of logical tracks that belong to the data set, and determines that a track is logically adjacent to the updated track being moved if the track is in the same data set that also includes the updated track.

6. A storage system as defined in claim 5, wherein the control processor determines that the track is logically adjacent if the track is in the same data set and is within a predetermined number of tracks from the updated track.

7. A storage system as defined in claim 1, wherein the control processor dynamically adjusts criteria for determining that a track is logically adjacent to the updated track being moved.

8. A storage system as defined in claim 7, wherein the criteria for determining logical adjacency are based at least partially on average seek distance of the disk arms for read requests performed by the control processor.

9. A storage system as defined in claim 7, wherein the criteria for determining logical adjacency are based at least partially on average seek time of the disk arms for read requests performed by the control processor.

10. A storage system as defined in claim 7, wherein:

the control processor maintains a statistical measure S that indicates the average seek distance of the disk arms for read requests, maintains an estimate S' that indicates the expected average seek distance of the disk arms for read requests era hypothetical storage system not organized as a log structured array but otherwise equivalent to the storage system, and maintains a first criterion k1 to determine that a track in the same logical segment and in the LSA cache memory is logically adjacent to the live track, and uses a second criterion k2 to determine that a track not in the LSA cache memory but in the direct access storage devices is logically adjacent to the live track.

11. A storage system as defined in claim 10, wherein the control processor determines the relative size of S and S' and increases the relative size of k1 and k2 by a predetermined first amount if S is less than or equal to S'.

12. A storage system as defined in claim 11, wherein the control processor increases the relative size of k1 and k2 by a second amount greater than the first amount if S is larger than S' by a predetermined trigger threshold.

13. A storage system controller that controls recording of data into a plurality of direct access storage devices, each direct access storage device having one or more disk platters with tracks of storage locations into which data is recorded and from which data is retrieved by disk arms according to a log structured architecture such that a group of storage locations comprising a segment column from each storage device comprises a segment's worth of data storage, the storage system controller comprising:

a memory segment in which data received from a host computer for recording into the storage locations of the storage devices is temporarily stored, the memory segment having a storage capacity of approximately one segment;

a log structured array (LSA) directory containing a mapping of logical track storage locations to disk storage locations;

an LSA cache memory having substantially greater storage capacity than the memory segment, in which updated logical tracks of data from the host computer and clean logical tracks from the storage devices are stored; and a control processor that receives data read requests from the host computer and, in response, first checks the LSA cache memory to find the requested data, then cheeks the memory segment, and then checks the storage devices; wherein:

the control processor determines when the memory segment is full and in response moves data in the memory segment into corresponding disk storage locations, and periodically moves an updated track and logically adjacent tracks from the LSA cache memory to the memory segment; and the control processor periodically moves a live track in a logical segment from the direct access storage devices to the memory segment, determines tracks also in the same logical segment that are logically adjacent to the live track, identifies the logically adjacent tracks that are in the LSA cache memory, identifies the logically adjacent tracks not in the LSA cache memory but in the direct access storage devices, retrieves the identified logically adjacent direct access storage device tracks, and moves the live track, the identified LSA cache memory tracks, and the retrieved tracks to the memory segment.

14. A storage system controller as defined in claim 13, wherein the control processor uses a first criterion to determine that a track in the same logical segment is logically adjacent to the live track and to determine that a track in the LSA cache memory is logically adjacent to the live track, and uses a second criterion to determine that a track not in the LSA cache memory but in the direct access storage devices is logically adjacent to the live track.

15. A storage system controller as defined in claim 13, wherein the control processor determines that a track is logically adjacent to the updated track being moved if the logically adjacent track is located within a predetermined number of logical tracks from the updated track.

16. A storage system controller as defined in claim 13, wherein the control processor determines that a track is logically adjacent to the updated track being moved if the logically adjacent track is located in a predetermined adjacency group that also includes the updated track.

17. A storage system controller as defined in claim 13, wherein the control processor receives data set information from the host computer when the control processor receives data for recording into the storage devices, determines the set of logical tracks that belong to the data set, and determines that a track is logically adjacent to the updated track being moved if the track is in the same data set that also includes the updated track.

18. A storage system controller as defined in claim 17, wherein the control processor determines that the track is logically adjacent if the track is in the same data set and is within a predetermined number of tracks from the updated track.

19. A storage system controller as defined in claim 13, wherein the control processor dynamically adjusts criteria for determining that a track is logically adjacent to the updated track being moved.

20. A storage system controller as defined in claim 19, wherein the criteria for determining logical adjacency are based at least partially on average seek distance of the disk arms for read requests performed by the control processor.

21. A storage system controller as defined in claim 19, wherein the criteria for determining logical adjacency are based at least partially on average seek time of the disk arms for read requests performed by the control processor.

22. A storage system as defined in claim 19, wherein:
the control processor maintains a statistical measure S that indicates the average seek distance of the disk arms for read requests, maintains an estimate S' that indicates the expected average seek distance of the disk arms for read requests of a hypothetical storage system not organized as a log structured array but otherwise equivalent to the storage system, and maintains a first criterion k1 to determine that a track in the same logical segment and in the LSA cache memory is logically adjacent to the live track, and uses a second criterion k2 to determine that a track not in the LSA cache memory but in the direct access storage devices is logically adjacent to the live track.

23. A storage system as defined in claim 22, wherein the control processor determines the relative size of S and S' and increases the relative size of k1 and k2 by a predetermined first amount if S is less than or equal to S'.

24. A storage system as defined in claim 23, wherein the control processor increases the relative size of k1 and k2 by a second mount greater than the first mount if S is larger than S' by a predetermined trigger threshold.

25. A method of managing a storage system, the storage system having a plurality of direct access storage devices, each having one or more disk platters with tracks of storage locations into which data is recorded and from which data is retrieved by disk arms according to a log structured architecture such that a group of storage locations comprising a segment column from each storage device comprises a segment's worth of data storage and the storage system maintains a memory segment in which data is temporarily stored and periodically written back to the direct access storage devices, the method comprising the steps of:

receiving a read request from a host computer for data;

determining if the data is stored in an LSA cache memory containing data from the direct access storage devices and responding to the read request by providing the requested data from the LSA cache memory if determined to be stored therein;

determining if the data is stored in the memory segment and responding to the read request by providing the requested data from the memory segment if determined to be stored therein;

determining the location of the requested data according to an LSA directory containing a mapping of logical track storage locations to direct access storage device locations, retrieving the requested data from the storage locations and satisfying the request, and copying the retrieved data into the LSA cache memory, if the requested data was determined not to be in either the LSA cache memory or memory segment;

determining when the memory segment is full and in response moving data in the memory segment into corresponding disk storage locations, and periodically moving an updated track and logically adjacent tracks from the LSA cache memory to the memory segment; and periodically moving a live track in a logical segment from the direct access storage devices to the memory segment, determining tracks also in the same logical segment that are logically adjacent to the live track, identifying the logically adjacent tracks that are in the LSA cache memory, identifying the logically adjacent tracks not in the LSA cache memory but in the direct access storage devices, retrieving the identified logically adjacent direct access storage device tracks, and moving the live track, the identified LSA cache memory tracks, and the retrieved tracks to the memory segment.

26. A method as defined in claim 25, wherein a first criterion is used to determine that a track in the same logical segment is logically adjacent to the live track and to determine that a track in the LSA cache memory is logically adjacent to the live track, and a second criterion is used to determine that a track not in the LSA cache memory but in the direct access storage devices is logically adjacent to the live track.

27. A method as defined in claim 25, wherein a track is logically determined to be adjacent to the updated track being moved if the logically adjacent track is located within a predetermined number of logical tracks from the updated track.

28. A method as defined in claim 25, wherein a track is determined to be logically adjacent to the updated track being moved if the logically adjacent track is located in a predetermined adjacency group that also includes the updated track.

29. A method as defined in claim 25, further including the steps of receiving data set information from the host computer when the control processor receives data for recording into the storage devices, determining the set of logical tracks that belong to the data set, and determining that a track is logically adjacent to the updated track being moved if the track is in the same data set that also includes the updated track.

30. A method as defined in claim 29, wherein the track is determined to be logically adjacent if the track is in the same data set and is within a predetermined number of tracks from the updated track.

31. A method as defined in claim 25, further including the step of dynamically adjusting criteria for determining that a track is logically adjacent to the updated track being moved.

32. A method as defined in claim 31, wherein the criteria for determining logical adjacency are based at least partially on average seek distance of the disk arms for read requests performed by the control processor.

33. A method as defined in claim 31, wherein the criteria for determining logical adjacency are based at least partially on average seek time of the disk arms for read requests performed by the control processor.

34. A method of managing a storage system as defined in claim 31, wherein the step of dynamically adjusting criteria for determining adjacency comprises:

maintaining a statistical measure S that indicates the average seek distance of the disk arms for read requests and maintaining an estimate S' that indicates the expected average seek distance of the disk arms for read requests of a hypothetical storage system not organized as a log structured array but otherwise equivalent to the storage system; and maintaining a first criterion k1 to determine that a track in the same logical segment and in the LSA cache memory is logically adjacent to the live track, and maintaining a second criterion k2 to determine that a track not in the LSA cache memory but in the direct access storage devices is logically adjacent to the live track.

35. A method as defined in claim 34, wherein the control processor compares the relative size of S and S' and increases the relative size of k1 and k2 by a predetermined first amount if S is less than of equal to S'.

36. A method as defined in claim 35, wherein the control processor increases the relative size of k1 and k2 by a second mount greater than the first mount if S is larger than S' by a predetermined trigger threshold.

37. A program product data storage device, tangibly embodying a program of machine-readable instructions executable by a computer to perform method steps for managing a storage system, where the storage system includes a plurality of direct access storage devices, each having one or more disk platters with tracks of storage locations into which data is recorded and from which data is retrieved by disk arms according to a log structured architecture such that a group of storage locations comprising a segment column from each storage device comprises a segment's worth of data storage and the storage system maintains a memory segment in which data is temporarily stored and periodically written back to the direct access storage devices, the performed method steps comprising:

receiving a read request from a host computer for data;

determining if the data is stored in an LSA cache memory containing data from the direct access storage devices and responding to the read request by providing the requested data from the LSA cache memory if determined to be stored therein;

determining if the data is stored in the memory Segment and responding to the read request by providing the requested data from the memory segment if determined to be stored therein; and determining the location of the requested data according to an LSA directory containing a mapping of logical track storage locations to direct access storage device locations, retrieving the requested data from the storage locations and satisfying the request, and copying the retrieved data into the LSA cache memory, if the requested data was determined not to be in either the LSA cache memory or memory segment;

determining when the memory segment is full and in response moving data in the memory segment into corresponding disk storage locations, and periodically moving an updated track and logically adjacent tracks from the LSA cache memory to the memory segment; and periodically moving a live track in a logical segment from the direct access storage devices to the memory segment, determining tracks also in the same logical segment that are logically adjacent to the live track, identifying the logically adjacent tracks that are in the LSA cache memory, identifying the logically adjacent tracks not in the LSA cache memory but in the direct access storage devices, retrieving the identified logically adjacent direct access storage device tracks, and moving the live track, the identified LSA cache memory tracks, and the retrieved tracks to the memory segment.

38. A program product as defined in claim 37, wherein the control processor uses a first criterion is used to determine that a track in the same logical segment is logically adjacent to the live track and to determine that a track in the LSA cache memory is logically adjacent to the live track, and a second criterion is used to determine that a track not in the LSA cache memory but in the direct access storage devices is logically adjacent to the live track.

39. A program product as defined in claim 37, wherein a track is determined to be logically adjacent to the updated track being moved if the logically adjacent track is located within a predetermined number of logical tracks from the updated track.

40. A program product as defined in claim 37, wherein a track is determined to be logically adjacent to the updated track being moved if the logically adjacent track is located in a predetermined adjacency group that also includes the updated track.

41. A program product as defined in claim 37, further including the performed method steps of receiving data set information from the host computer when the control processor receives data for recording into the storage devices, determining the set of logical tracks that belong to the data set, and determining that a track is logically adjacent to the updated track being moved if the track is in the same data set that also includes the updated track.

42. A program product as defined in claim 41, wherein the track is determined to be logically adjacent if the track is in the same data set and is within a predetermined number of tracks from the updated track.

43. A program product as defined in claim 37, further including the performed method step of dynamically adjusting criteria for determining that a track is logically adjacent to the updated track being moved.

44. A program product as defined in claim 43, wherein the criteria for determining logical adjacency are based at least partially on average seek distance of the disk arms for read requests performed by the control processor.

45. A program product as defined in claim 43, wherein the criteria for determining logical adjacency are based at least partially on average seek time of the disk arms for read requests performed by the control processor.

46. A program product as defined in claim 43, wherein the performed method step of dynamically adjusting the criteria for determining logical adjacency comprises:

maintaining a statistical measure S that indicates the average seek distance of the disk arms for read requests and maintaining an estimate S' that indicates the expected average seek distance of the disk arms for read requests of a hypothetical storage system not organized as a log structured array but otherwise equivalent to the storage system; and maintaining a first criterion k1 to determine that a track in the same logical segment and in the LSA cache memory is logically adjacent to the live track, and maintaining a second criterion k2 to determine that a track not in the LSA cache memory but in the direct access storage devices is logically adjacent to the live track.

47. A program product as defined in claim 46, wherein the control processor determines the relative size of S and S' and increases the relative size of k1 and k2 by a predetermined first amount if S is less than or equal to S'.

48. A program product as defined in claim 47, wherein the control processor increases the relative size of k1 and k2 by a second mount greater than the first mount if S is larger than S' by a predetermined trigger threshold.

* * * * *